US012794368B2

(12) United States Patent
Tanji et al.

(10) Patent No.: US 12,794,368 B2
(45) Date of Patent: Nov. 10, 2026

(54) DC/DC CONVERTER OPERABLE EFFICIENTLY WHILE PREVENTING REVERSE CURRENT

(71) Applicant: NISSHINBO MICRO DEVICES INC., Tokyo (JP)

(72) Inventors: Kagehito Tanji, Ikeda (JP); Shiro Matsushita, Ikeda (JP)

(73) Assignee: NISSHINBO MICRO DEVICES INC., Tokyo (JP)

( * ) Notice: Subject to any disclaimer, the term of this patent is extended or adjusted under 35 U.S.C. 154(b) by 194 days.

(21) Appl. No.: 18/872,465

(22) PCT Filed: Jun. 13, 2022

(86) PCT No.: PCT/JP2022/023650

§ 371 (c)(1),
(2) Date: Dec. 6, 2024

(87) PCT Pub. No.: WO2023/242911

PCT Pub. Date: Dec. 21, 2023

(65) Prior Publication Data

US 2025/0357846 A1 Nov. 20, 2025

(51) Int. Cl.
*H02M 3/158* (2006.01)
*H02M 1/08* (2006.01)

(52) U.S. Cl.
CPC ........... *H02M 3/158* (2013.01); *H02M 1/083* (2013.01)

(58) Field of Classification Search
CPC ........ H02M 3/158; H02M 1/083; H02M 1/08; H02M 1/0003; H02M 3/157
See application file for complete search history.

(56) References Cited

U.S. PATENT DOCUMENTS 8,836,294 B2 9/2014 Kung
2013/0207625 A1* 8/2013 Futamura .............. H02M 3/158 323/283

(Continued)

FOREIGN PATENT DOCUMENTS

JP 2013-150515 A 8/2013
JP 2014-117109 A 6/2014

(Continued)

OTHER PUBLICATIONS

Dec. 26, 2024 Notification of Transmittal of Copies of Translation of the International Preliminary Report on Patentability (IPRP) in connection with PCT/JP2022/023650.

(Continued)

*Primary Examiner* — Alex Torres-Rivera

(57) ABSTRACT

A switching modulation circuit generates a first control signal with a duty ratio. A delay circuit delays the first control signal to generate a second control signal. A zero crossing detector detects whether an output current of a DC/DC converter is smaller than a threshold in a rectification interval, and generates a third control signal. A monitoring circuit detects a reverse-flow possibility of the output current, and generates a fourth control signal. A delay time of the delay circuit is set shorter than the delay time of the zero crossing detector. When the reverse-flow possibility does not exist, and the third control signal has transitioned to indicate that the output current is smaller than the threshold, a driver circuit turns off both first and second switching elements. When the reverse-flow possibility exists, and the second control signal has transitioned from an ON state to an OFF state, the driver circuit turns off both the first and second switching elements.

9 Claims, 19 Drawing Sheets

1A

(56) References Cited

U.S. PATENT DOCUMENTS

| | | | | |
|---|---|---|---|---|
| 2014/0043005 | A1 | 2/2014 | Ide | |
| 2014/0159691 | A1 | 6/2014 | Miyamae | |
| 2015/0236590 | A1 * | 8/2015 | Yonezawa ............... | H02M 1/08 323/271 |
| 2017/0346402 | A1 | 11/2017 | Ishino et al. | |

FOREIGN PATENT DOCUMENTS

| | | | |
|---|---|---|---|
| JP | 2017-212797 | A | 11/2017 |
| WO | 2012/144163 | A1 | 10/2012 |

OTHER PUBLICATIONS

International Search Report dated Aug. 9, 2022 in connection with PCT/JP2022/023650.

* cited by examiner

1A

DC/DC CONVERTER OPERABLE EFFICIENTLY WHILE PREVENTING REVERSE CURRENT

TECHNICAL FIELD

The present disclosure relates to a DC/DC converter and a control circuit thereof.

BACKGROUND ART

In recent years, as mobile devices are made with improved performance and reduced size, a hysteresis-controlled switching power supply operable at a high frequency, with high efficiency, and reducible in size is widely used as a power circuit. For example, Patent Document 1 discloses a switching regulator that operates in a synchronous mode in which two power transistors are complementarily turned on, and an asynchronous mode in which a high-side power transistor is turned on and off while a low-side power transistor is always turned off.

CITATION LIST

Patent Documents

PATENT DOCUMENT 1: U.S. Pat. No. 8,836,294 B2

SUMMARY OF INVENTION

Technical Problem

When a DC/DC converter performs synchronous rectification under a light load, a reverse current may appear at its output terminal, thus significantly reducing the efficiency thereof. In order to prevent the reverse current, for example, a current detection circuit may be used to monitor the output current of the DC/DC converter. However, in general, since the current detection circuit has an inherent delay time, it is not possible to immediately turn off switching elements upon detection of a sign of a reverse current about to flow, for example, the output current being smaller than a predetermined threshold. As a result, the reverse current occurs while the switching element is on, thus resulting in reduced efficiency. In addition, when the output current has a small peak, it is considered that a reverse current may occur, and the switching elements may be turned off. However, when the switching elements are turned off, the energy in an inductor is released, and currents flow through body diodes of the switching elements, thus resulting in reduced efficiency. Therefore, it is required to operate the DC/DC converter more efficiently than the prior art, while preventing or at least reducing the reverse current.

An object of the present disclosure is to provide a control circuit of a DC/DC converter, the control circuit being capable of operating the DC/DC converter more efficiently than the prior art, while preventing or at least reducing a reverse current. Further, another object of the present disclosure is to provide a DC/DC converter provided with such a control circuit.

Solution to Problem

According to a control circuit for a DC/DC converter of one aspect of the present disclosure, the control circuit is provided for controlling the DC/DC converter having an inductor and first and second switching elements. The first and second switching elements store energy to the inductor and release the energy from the inductor. The control circuit is provided with: a switching modulation circuit, a delay circuit, a zero crossing detector, a monitoring circuit, and a driver circuit. The switching modulation circuit is configured to generate a first control signal having a duty ratio including an ON state and an OFF state. The delay circuit is configured to delay the first control signal for a first delay time to generate a second control signal. The zero crossing detector is configured to detect whether or not an output current of the DC/DC converter is smaller than a first threshold when releasing the energy from the inductor, and to generate a third control signal indicating whether or not the output current is smaller than the first threshold. The monitoring circuit is configured to detect whether or not a reverse-flow possibility exists, the reverse-flow possibility indicating a possibility in which the output current reversely flows, and to generate a fourth control signal indicating whether or not the reverse-flow possibility exists. The driver circuit is configured to generate drive signals for turning on and off the first and second switching elements, based on the first to fourth control signals. The zero crossing detector has a second delay time from detecting that the output current is smaller than the first threshold, to transitioning the third control signal, the second delay time being inherent to the zero crossing detector. The first delay time is set shorter than the second delay time. When the fourth control signal indicates that the reverse-flow possibility does not exist, the inductor is releasing the energy, and the third control signal has transitioned to indicate that the output current is smaller than the first threshold, the driver circuit turns off both the first and second switching elements. When the fourth control signal indicates that the reverse-flow possibility exists, the inductor is releasing the energy, and the second control signal has transitioned from an ON state to an OFF state, the driver circuit turns off both the first and second switching elements.

Advantageous Effects of Invention

According to one aspect of the present disclosure, it is possible to operate the DC/DC converter more efficiently than the prior art, while preventing or at least reducing a reverse current.

DESCRIPTION OF EMBODIMENTS

Hereinafter, embodiments of the present disclosure will be described with reference to the drawings. Similar components are denoted by the same reference sign throughout the drawings.

Prior to detailed description of the embodiments of the present disclosure, the configurations and operations of DC/DC converters according to comparison examples will be described.

First Comparison Example

Figure 15:
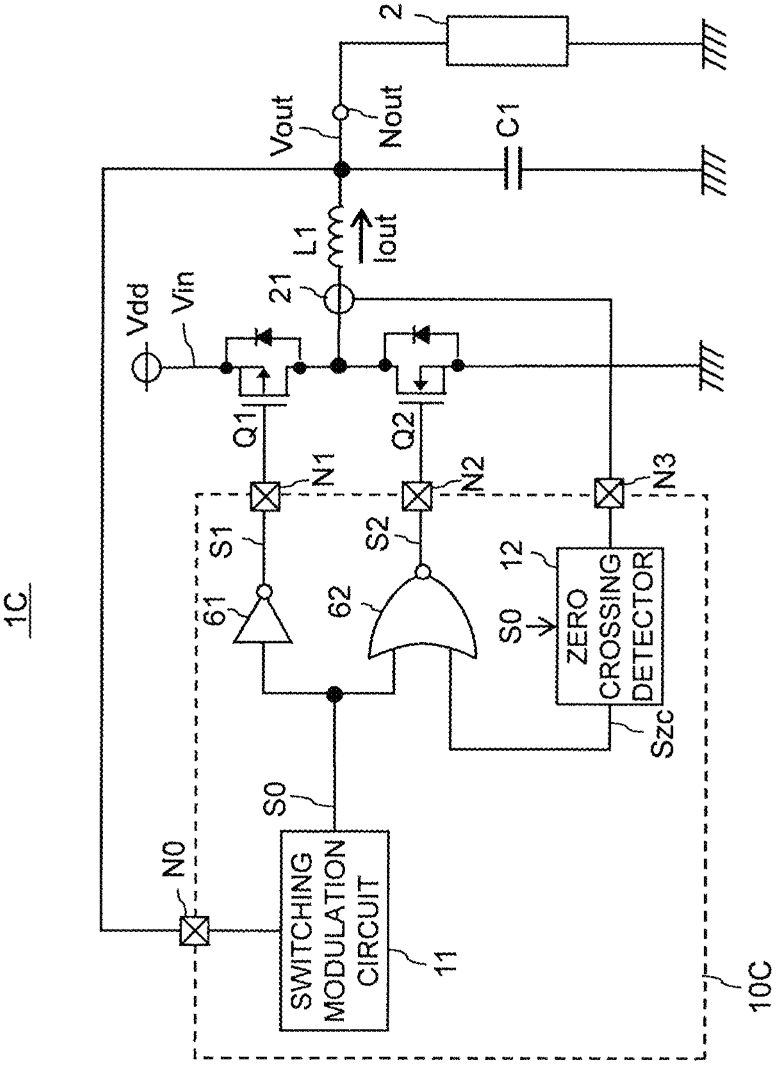
FIG. 15 is a block diagram showing a configuration of a DC/DC converter 1C according to a first comparison example.

FIG. 15 is a block diagram showing a configuration of a DC/DC converter 1C according to a first comparison example. The DC/DC converter 1C is supplied with an input voltage Vin from an input voltage source Vdd, generates an output voltage Vout at an output terminal Nout of the DC/DC converter 1C, and supplies the output voltage Vout to a load device 2. The DC/DC converter 1C is an example of a step-down converter that generates the output voltage Vout lower than the input voltage Vin.

The DC/DC converter 1C is provided with: switching elements Q1 and Q2, an inductor L1, a capacitor C1, a control circuit 10C, and a current sensor 21.

The switching elements Q1 and Q2 are connected in series between the input voltage source Vdd and a ground. The switching elements Q1 and Q2 are provided on a high side and a low side, respectively. The switching element Q1 is, for example, a P-channel field effect transistor, and the switching element Q2 is, for example, an N-channel field effect transistor.

The inductor L1 is connected between a node between the switching elements Q1 and Q2, and the output terminal Nout of the DC/DC converter 1C. The capacitor C1 is connected between the output terminal Nout of the DC/DC converter 1C and the ground.

The current sensor 21 detects a value of an output current Iout of the DC/DC converter 1C. In the first comparison example, a zero crossing detector 12 (described later) of the control circuit 10C uses the value of the output current Iout flowing when releasing energy from the inductor L1. Therefore, the current sensor 21 may be configured to detect the value of the output current Iout by, for example, monitoring a voltage across the switching element Q2.

The control circuit 10C generates drive signals S1 and S2 for controlling on and off of the switching elements Q1 and Q2, based on the values of the output voltage Vout and the output current Iout, and applies the drive signals S1 and S2 to control electrodes (gates) of the switching elements Q1 and Q2. Thus, the control circuit 10C controls the switching elements Q1 and Q2 to store energy to the inductor L1 and release energy from the inductor L1.

The control circuit 10C is provided with: a switching modulation circuit 11, a zero crossing detector 12, an inverter 61, and a negative OR (NOR) circuit 62.

The switching modulation circuit 11 generates a signal S0 having a duty ratio including an ON state and an OFF state, based on the value of the output voltage Vout. The switching modulation circuit 11 changes the duty ratio of the signal S0 so that the output voltage Vout matches a desired voltage of the load device 2.

The zero crossing detector 12 detects that the output current Iout of the DC/DC converter 1 has become smaller than a threshold Ith1 when releasing the energy from the inductor L1, and generates a signal Sze indicating whether or not the output current Iout is smaller than the threshold Ith1. When the output current Iout is equal to or larger than the threshold Ith1 when releasing the energy from the inductor L1, the signal Sze is low, and when the output current Iout is smaller than the threshold Ith1 when releasing the energy from the inductor L1, the signal Szc is high. The zero crossing detector 12 has an inherent delay time d1, which is from detecting that the output current Iout is smaller than the threshold Ith1, to transitioning the signal Sze.

The inverter 61 inverts the signal S0 to generate a signal S1. The NOR circuit 62 produces a negative OR of the signals S0 and Sze to generate the signal S2.

Figure 16:
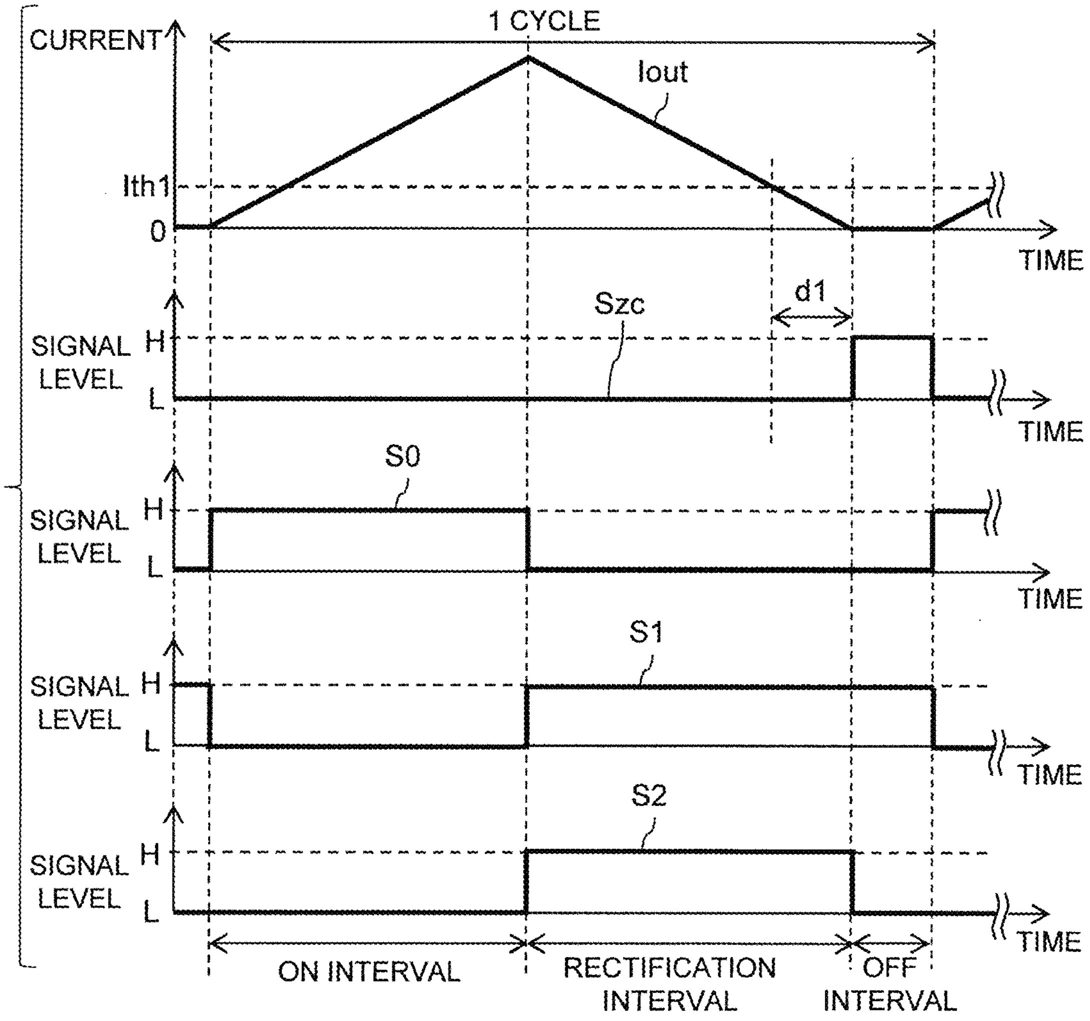
FIG. 16 is a timing chart showing a first exemplary operation of the DC/DC converter 1C of FIG. 15.
Figure 17:
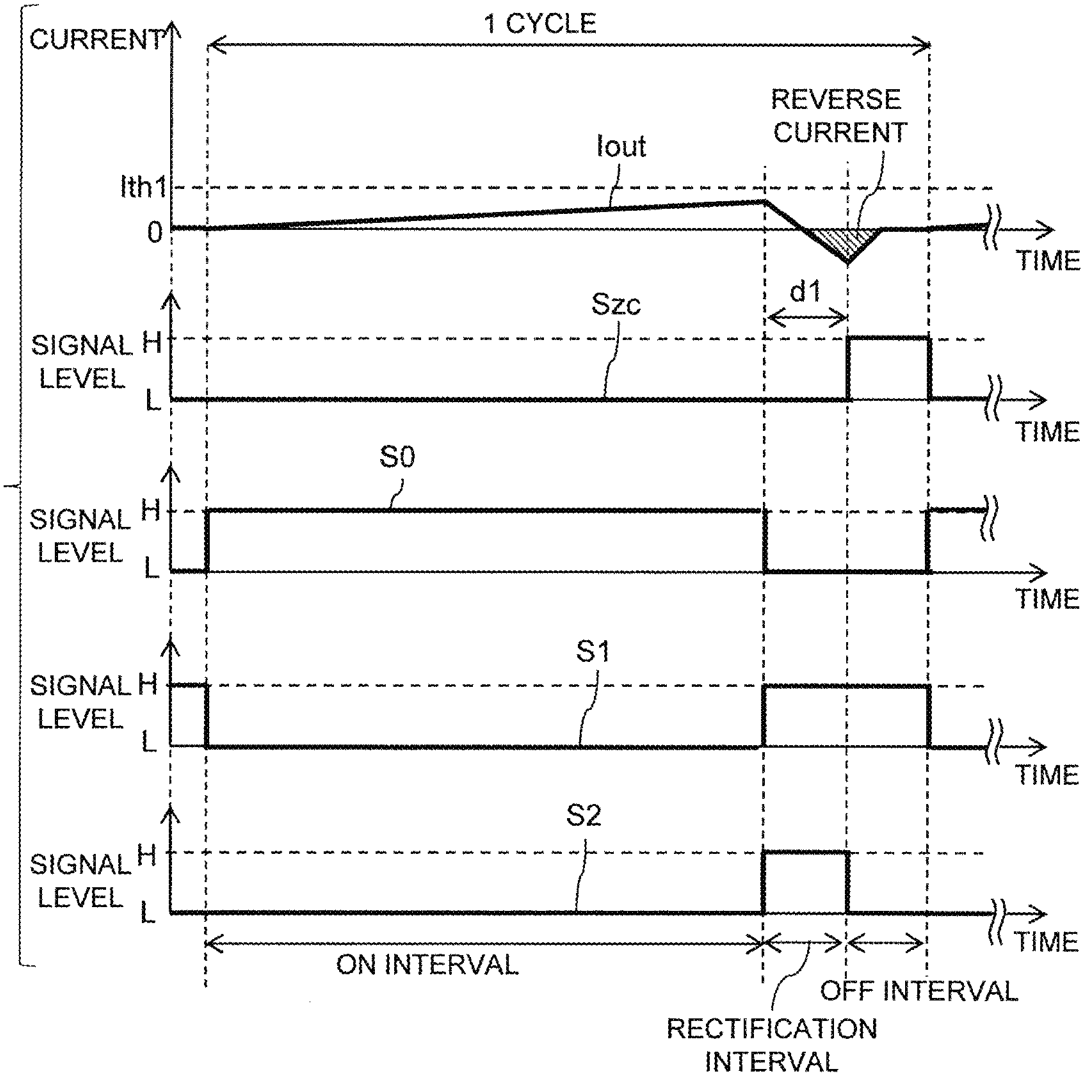
FIG. 17 is a timing chart showing a second exemplary operation of the DC/DC converter 1C of FIG. 15.

FIG. 16 is a timing chart showing a first exemplary operation of the DC/DC converter 1C of FIG. 15. FIG. 17 is a timing chart showing a second exemplary operation of the DC/DC converter 1C of FIG. 15. FIGS. 16 and 17 show the output current Iout, the signal Szc, and the signals S0 to S1 of FIG. 15. Switching operations of the switching elements Q1 and Q2 include an ON interval, a rectification interval, and an OFF interval in each cycle. The "ON interval" is a time interval for storing the energy to the inductor. In the example of FIG. 15, the ON interval is a time interval in which the switching element Q1 is turned on, and the switching element Q2 is turned off. The "rectification interval" is a time interval for releasing the energy from the inductor. In the example of FIG. 15, the rectification interval is a time interval in which the switching element Q1 is turned off, and the switching element Q2 is turned on. The "OFF interval" is a time interval in which both the switching elements Q1 and Q2 are turned off.

FIG. 16 shows a case where the output current Iout has a sufficiently large peak. In this case, in the rectification interval, the zero crossing detector 12 causes the signal Szc to transition from low (L) to high (H) after the delay time d1 has elapsed since the output current Iout became smaller than the threshold Ith1. Thus, both the switching elements Q1 and Q2 are turned off. The threshold Ith1 is set such that the output current Iout becomes zero at the moment when the signal Szc rises, in consideration of the delay time d1 of the zero crossing detector 12. As shown in FIG. 16, when the output current Iout has a sufficiently large peak, the signal Szc transitions from low to high before a reverse current occurs, even when the zero crossing detector 12 has the delay time d1. Accordingly, it is possible to prevent or at least reduce a reverse current using the zero crossing detector 12. In addition, the zero crossing detector 12 resets the signal Szc to be low at the end of the cycle, based on the signal S0.

On the other hand, FIG. 17 shows a case where the output current Iout has a peak smaller than the threshold Ith1. In this case, the zero crossing detector 12 detects that the output current Iout is smaller than the threshold Ith1 at the time when the rectification interval starts. However, due to the delay time d1, the zero crossing detector 12 can not cause the signal Szc to immediately transition from low to high. Therefore, the switching element Q2 is not turned off at the time when the output current Iout decreases to zero, and thus, a reverse current occurs.

According to the DC/DC converter 1C of FIG. 15, even when the zero crossing detector 12 is provided, there is a possibility of failing to prevent a reverse current when the output current Iout has a small peak. Accordingly, it is required to more reliably prevent or at least reduce a reverse current.

Second Comparison Example

Figure 18:
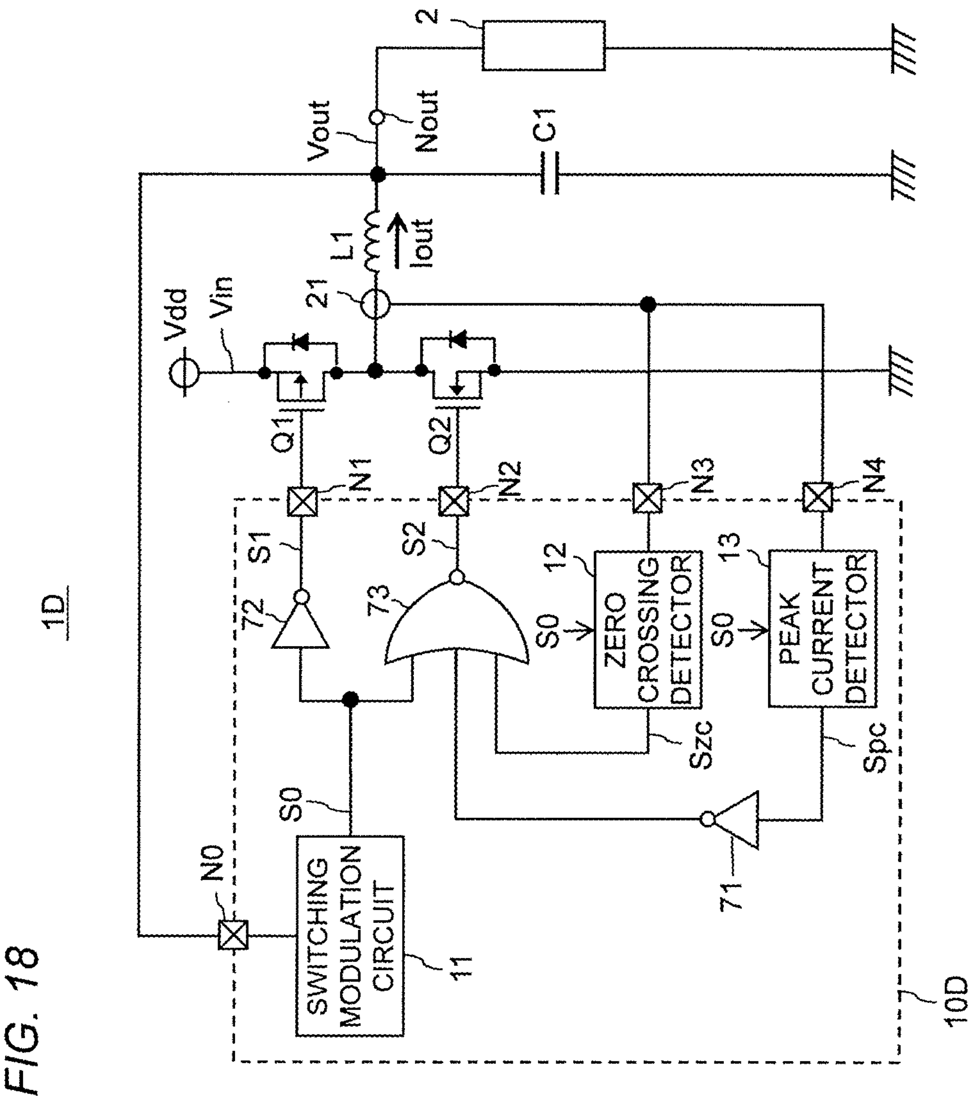
FIG. 18 is a block diagram showing a configuration of a DC/DC converter 1D according to a second comparison example.

FIG. 18 is a block diagram showing a configuration of a DC/DC converter 1D according to a second comparison example. The DC/DC converter 1D is provided with a control circuit 10D instead of the control circuit 10C of FIG. 15.

The control circuit 10D is provided with: a switching modulation circuit 11, a zero crossing detector 12, a peak current detector 13, an inverter 71, an inverter 72, and a negative OR (NOR) circuit 73.

The switching modulation circuit 11 and the zero crossing detector 12 of FIG. 18 are configured and operate in a manner similar to that of the corresponding components of FIG. 15.

The peak current detector 13 detects a reverse-flow possibility indicating a possibility in which the output current Iout reversely flows, and generates a signal Spc indicating whether or not the reverse-flow possibility exists. The peak current detector 13 detects, as the reverse-flow possibility, that the output current Iout does not exceed a threshold Ith2 when storing the energy to the inductor L1. When the output current Iout is equal to or smaller than the threshold Ith2 when storing the energy to the inductor L1, the signal Spc is low, and when the output current Iout is larger than the threshold Ith2 when storing the energy to the inductor L1, the signal Spc is high. The reverse-flow possibility is, for example, a sign of a reverse current about to flow. The peak current detector 13 has an inherent delay time d2, which is from detecting that the output current Iout is larger than the threshold Ith2, to transiting the signal Spc.

The inverter 71 inverts the signal Spc. The inverter 72 inverts a signal S0 to generate a signal S1. The NOR circuit 73 produces a negative OR of the signal S0, the inverted signal of the signal Spc, and a signal Sze to generate the signal S2.

In the second comparison example, the zero crossing detector 12 of the control circuit 10D uses the value of the output current Iout flowing when releasing the energy from the inductor L1. Therefore, the current sensor 21 may be configured to detect the value of the output current Iout by, for example, monitoring the voltage across the switching element Q2, for the zero crossing detector 12. In addition, in the second comparison example, the peak current detector 13 (described later) of the control circuit 10D uses the value of the output current Iout flowing when storing the energy to the inductor L1. Therefore, the current sensor 21 may be configured to detect the value of the output current Iout by, for example, monitoring a voltage across the switching element Q1, for the peak current detector 13.

Figure 19:
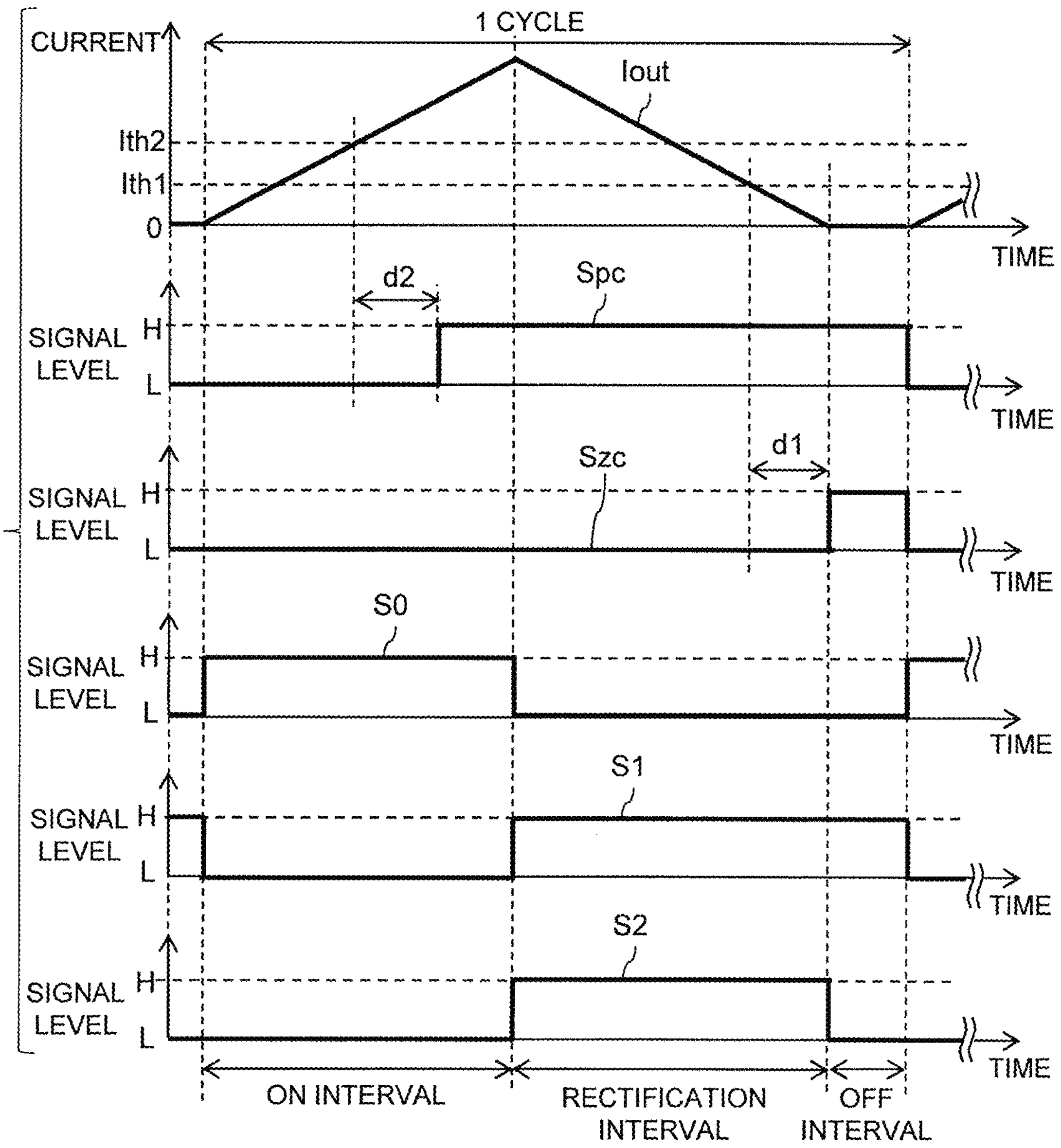
FIG. 19 is a timing chart showing a first exemplary operation of the DC/DC converter 1D of FIG. 18.
Figure 20:
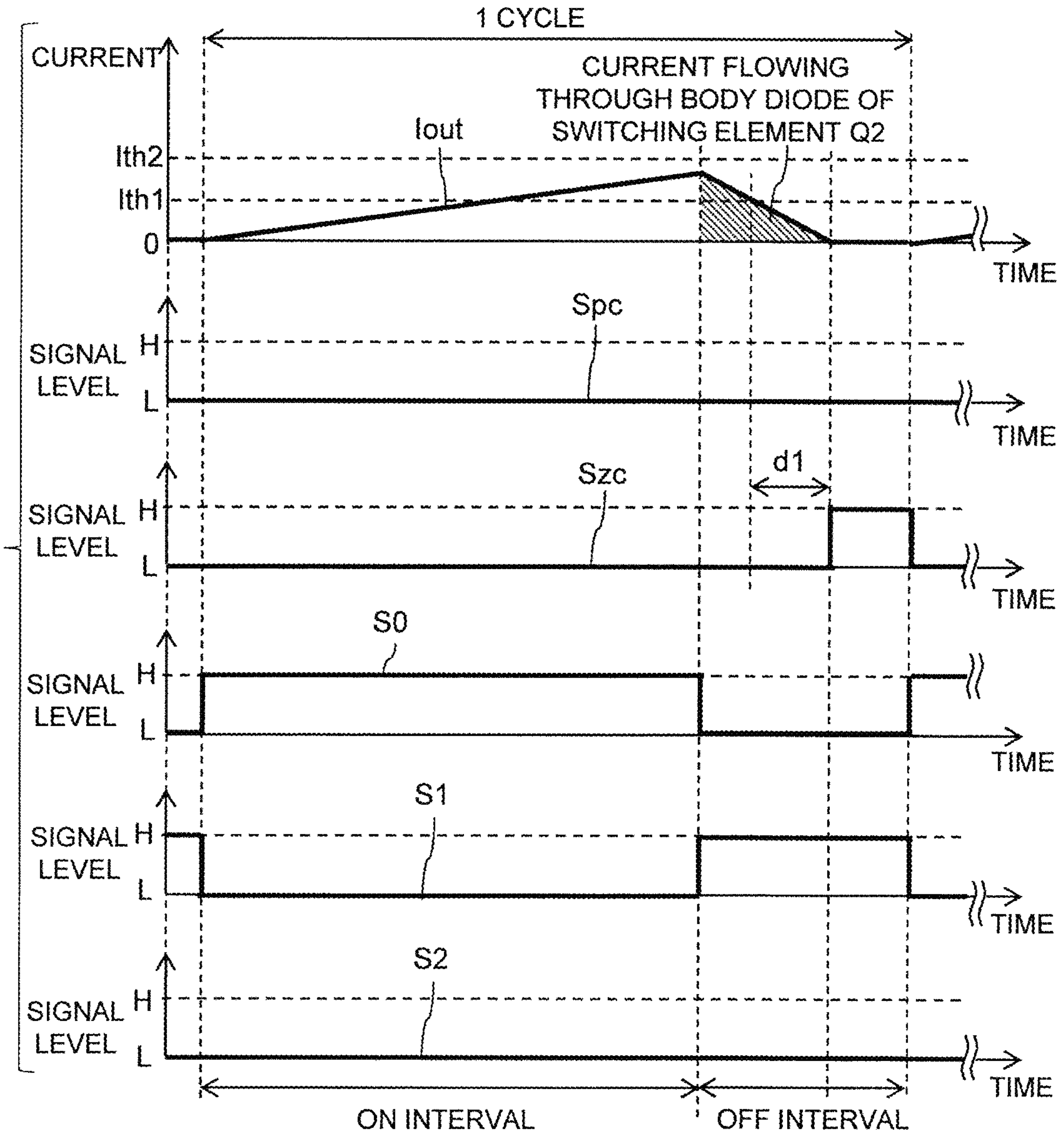
FIG. 20 is a timing chart showing a second exemplary operation of the DC/DC converter 1D of FIG. 18.
Figure 21:
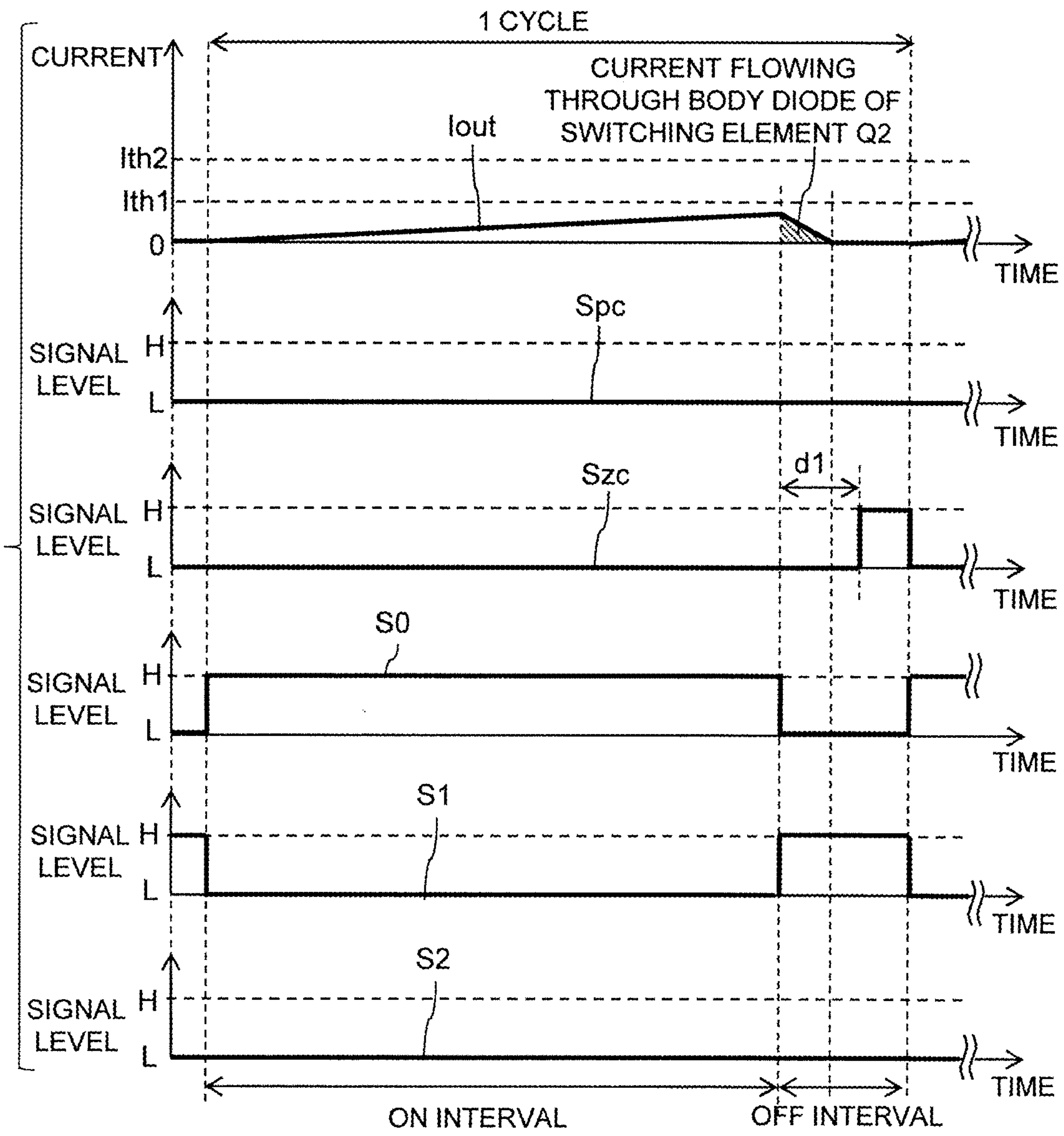
FIG. 21 is a timing chart showing a third exemplary operation of the DC/DC converter 1D of FIG. 18.

FIG. 19 is a timing chart showing a first exemplary operation of the DC/DC converter 1D of FIG. 18. FIG. 20 is a timing chart showing a second exemplary operation of the DC/DC converter 1D of FIG. 18. FIG. 21 is a timing chart showing a third exemplary operation of the DC/DC converter 1D of FIG. 18. FIGS. 19 to 21 show the signal Spc in addition to the signals shown in FIGS. 16 and 17.

FIG. 19 shows a case where the output current Iout has a sufficiently large peak, for example, a peak larger than the threshold Ith2. As described with reference to FIG. 16, the threshold Ith2 is set such that the output current Iout has a sufficiently large peak to cause the signal Sze to transition from low to high before a reverse current occurs. The threshold Ith2 may be set larger than the threshold Ith1 as shown in FIG. 19. In this case, in the ON interval, the peak current detector 13 causes the signal Spc to transition from low to high after the delay time d2 has elapsed since the output current Iout became larger than the threshold Ith2. Thereafter, in the rectification interval, the zero crossing detector 12 causes the signal Sze to transition from low to high after the delay time d1 has elapsed since the output current Iout became smaller than the threshold Ith1. Thus, both the switching elements Q1 and Q2 are turned off. The peak current detector 13 resets the signal Spc to be low at the end of the cycle, based on the signal S0.

FIG. 20 shows a case where the output current Iout has a peak larger than the threshold Ith1 and smaller than the threshold Ith2. In this case, the signal Spc remains low, the switching element Q2 is not turned on even when the ON interval ends, and the operation just proceeds to the OFF interval. Since the switching element Q2 is not turned on, no reverse current occurs. However, the energy in the inductor L1 is released by flowing through a body diode of the s witching element Q2.

FIG. 21 shows a case where the output current Iout has a peak smaller than the threshold Ith1. Also in this case, in a manner similar to that of FIG. 20, the signal Spc remains low, the switching element Q2 is not turned on even when the ON interval ends, and the operation just proceeds to the OFF interval. The energy in the inductor L1 is released by flowing through the body diode of the switching element Q2.

Since the DC/DC converter 1D of FIG. 18 is provided with the peak current detector 13, it is possible to prevent a reverse current. However, since the current flows through the body diode of the switching element Q2 in the OFF interval, the efficiency degrades as compared with the case where the switching element Q2 is turned on. Therefore, it is required to operate a DC/DC converter more efficiently, while preventing or at least reducing a reverse current.

Hereinafter, a DC/DC converter according to an embodiment will be described, which is operable more efficiently than the prior art, while preventing or at least reducing a reverse current.

First Embodiment

A DC/DC converter according to a first embodiment will be described with reference to FIGS. 1 to 9.

[Configuration of First Embodiment]

Figure 1:
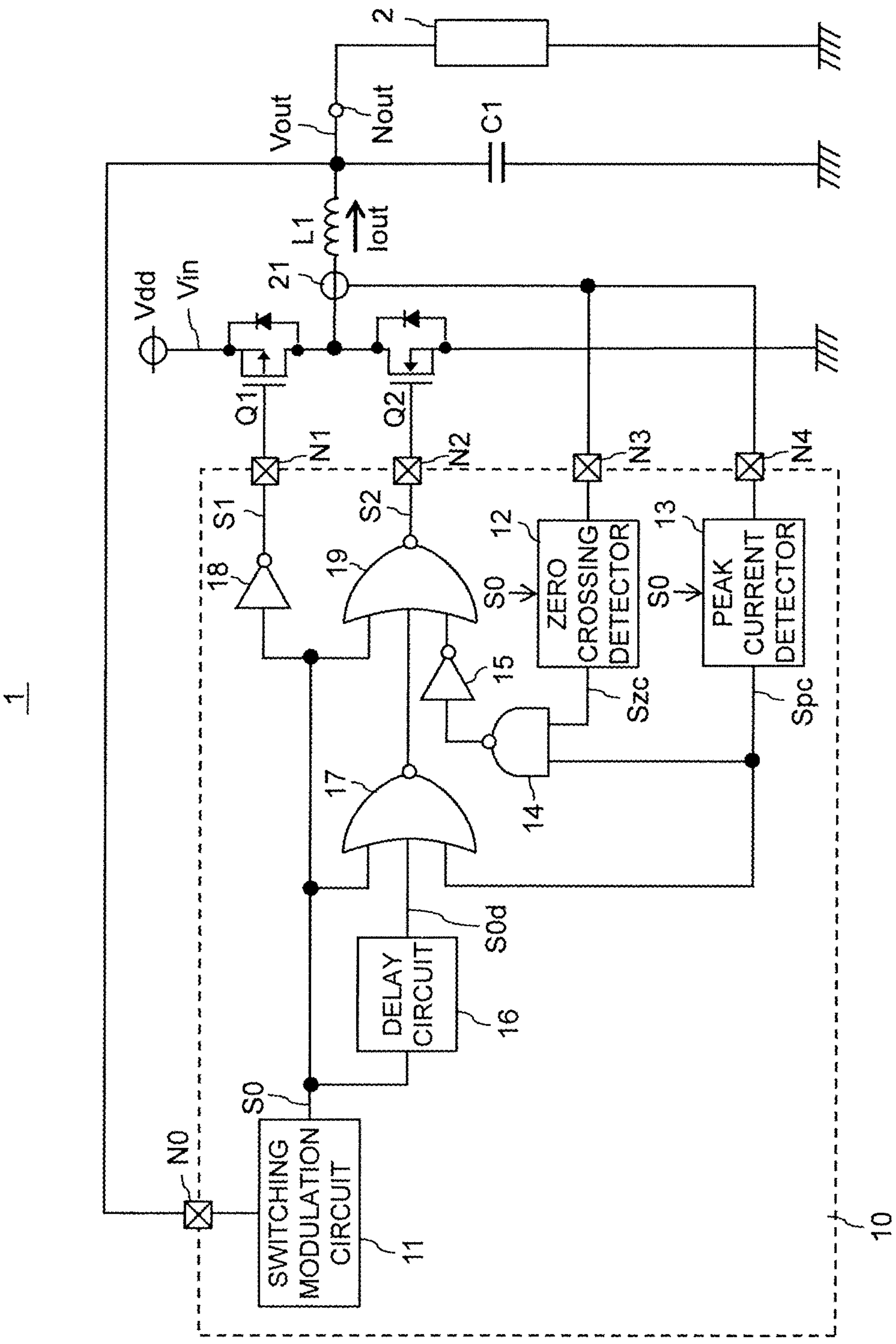
FIG. 1 is a block diagram showing a configuration of a DC/DC converter 1 according to a first embodiment.

FIG. 1 is a block diagram showing a configuration of a DC/DC converter 1 according to a first embodiment. The DC/DC converter 1 is provided with: switching elements Q1 and Q2, an inductor L1, a capacitor C1, a control circuit 10, and a current sensor 21.

The switching elements Q1 and Q2, the inductor L1, the capacitor C1, and the current sensor 21 of FIG. 1 are configured and operate in a manner similar to that of the corresponding components of FIGS. 15 and 18.

The control circuit 10 is provided with: a switching modulation circuit 11, a zero crossing detector 12, a peak current detector 13, a negative AND (NAND) circuit 14, an inverter 15, a delay circuit 16, a negative OR (NOR) circuit 17, an inverter 18, and a negative OR (NOR) circuit 19. The control circuit 10 may be configured as an integrated circuit having terminals N0 to N4.

The switching modulation circuit 11, the zero crossing detector 12, and the peak current detector 13 of FIG. 1 are configured and operate in a manner similar to that of the corresponding components of FIG. 18.

The NAND circuit 14 produces a negative AND of the signals Szc and Spc. The inverter 15 inverts an output signal of the NAND circuit 14.

The delay circuit 16 delays the signal S0 for a delay time d10 to generate a signal S0*d*. The length of the delay time d10 is set shorter than the delay time d1 of the zero crossing detector 12. The length of the delay time d10 may be fixed, or may vary according to the peak of the output current out, or according to the difference between the input voltage Vin and the output voltage Vout.

The NOR circuit 17 produces a negative OR of the signal S0, the signal S0*d*, and the signal Spc. The inverter 18 inverts the signal S0 to generate a signal S1. The NOR circuit 19 produces a NOR of the signal S0, an output signal of the inverter 15, and an output signal of the NOR circuit 17 to generate a signal S2.

The peak current detector 13 is an example of a monitoring circuit that detects the reverse-flow possibility of the output current Iout, and generates a control signal indicating whether or not the reverse-flow possibility exists. In addition, the NAND circuit 14, the inverter 15, the NOR circuit 17, the inverter 18, and the NOR circuit 19 are an example of a driver circuit that generates drive signals S1 and S2 for turning on and off the switching elements Q1 and Q2, based on the signals S0, S0*d*. Szc, and Spc.

[Operation of First Embodiment]

Figure 2:
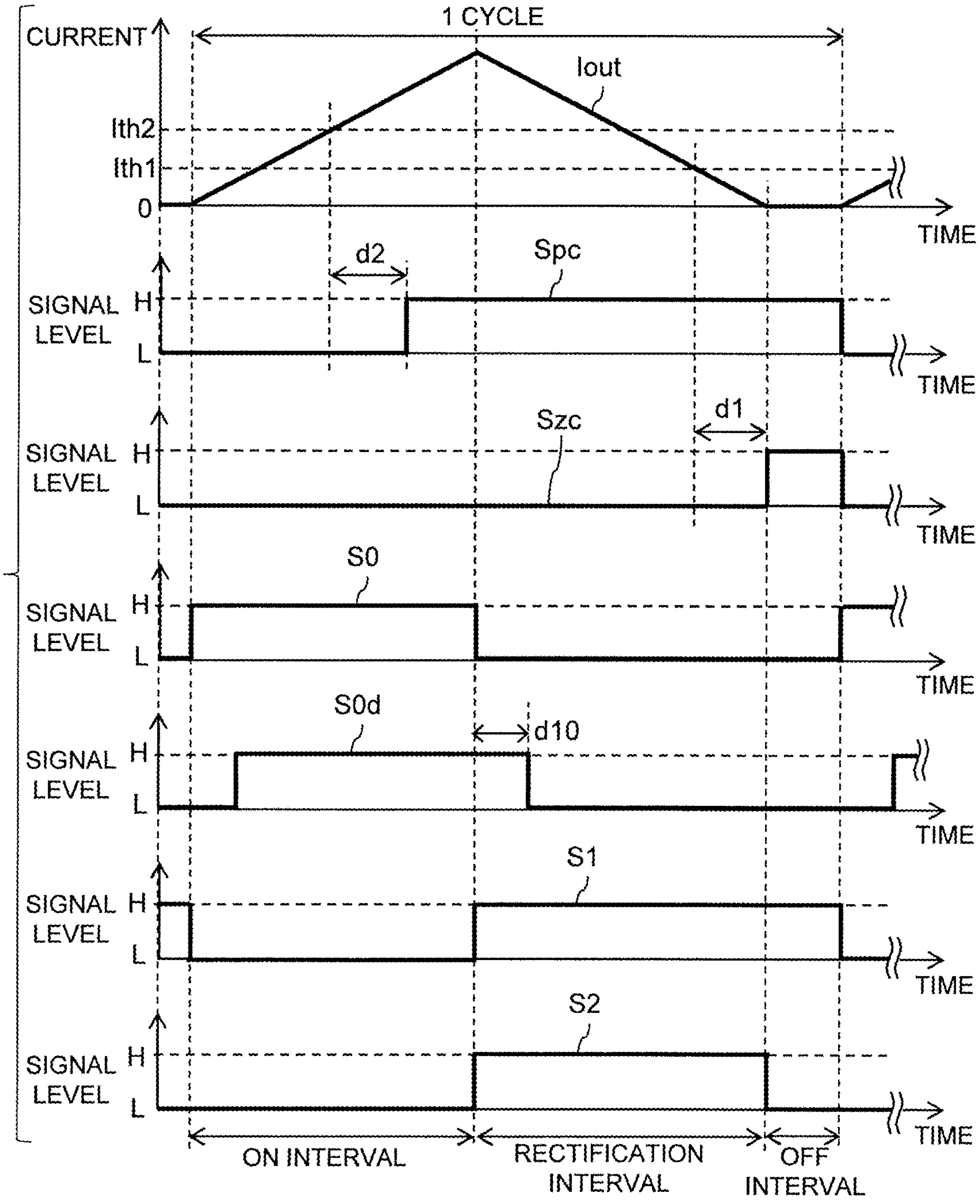
FIG. 2 is a timing chart showing a first exemplary operation of the DC/DC converter 1 of FIG. 1.
Figure 3:
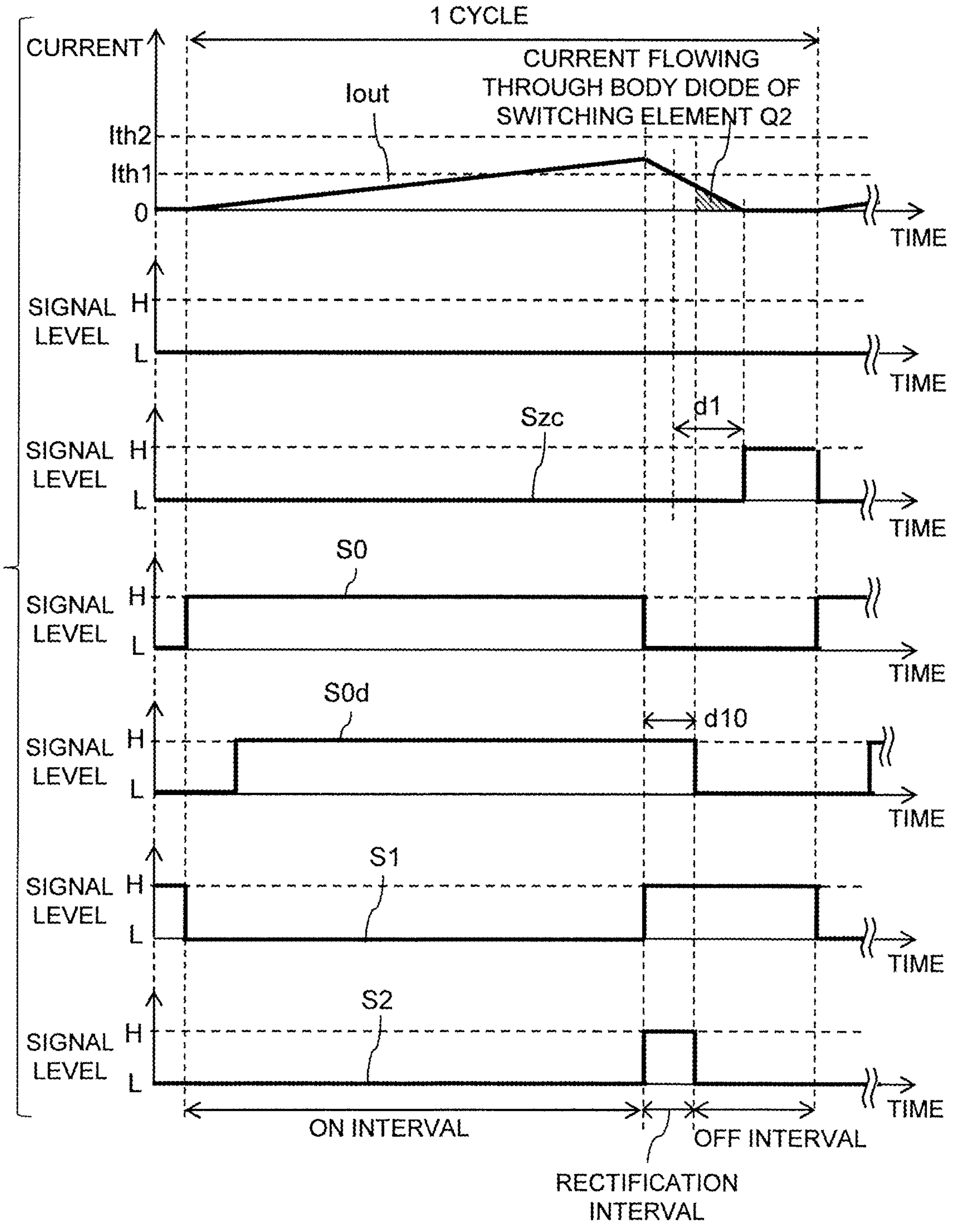
FIG. 3 is a timing chart showing a second exemplary operation of the DC/DC converter 1 of FIG. 1.
Figure 4:
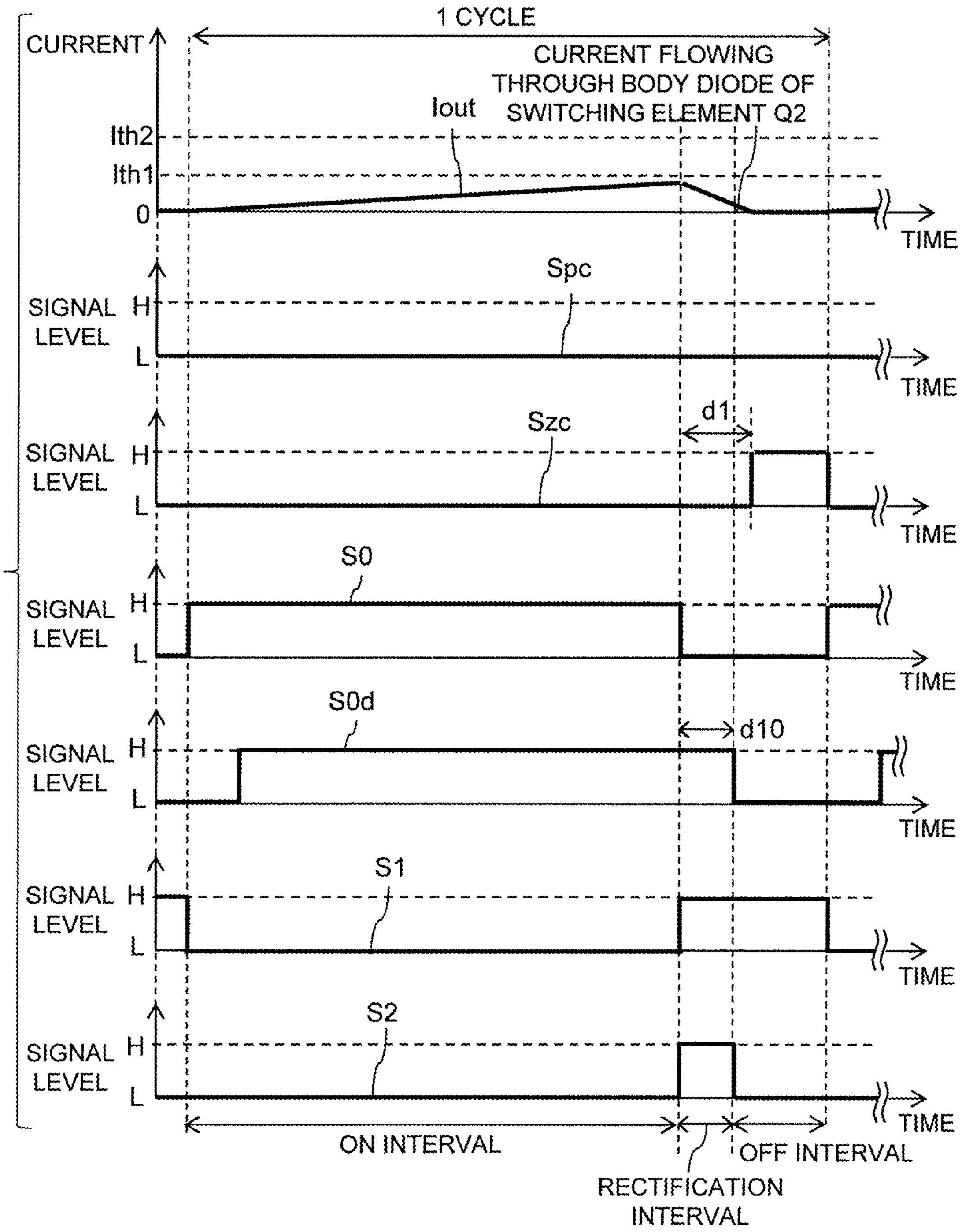
FIG. 4 is a timing chart showing a third exemplary operation of the DC/DC converter 1 of FIG. 1.

FIG. 2 is a timing chart showing a first exemplary operation of the DC/DC converter 1 of FIG. 1. FIG. 3 is a timing chart showing a second exemplary operation of the DC/DC converter 1 of FIG. 1. FIG. 4 is a timing chart showing a third exemplary operation of the DC/DC converter 1 of FIG. 1. FIGS. 2 to 4 show a signal S0*d* in addition to the signals shown in FIGS. 19 to 21.

FIG. 2 shows a case where the output current Iout has a sufficiently large peak, that is, a peak larger than the threshold Ith2. In this case, in the ON interval, the peak current detector 13 causes the signal Spc to transition from low to high after the delay time d2 has elapsed since the output current Iout became larger than the threshold Ith2. Thereafter, in the rectification interval, the zero crossing detector 12 causes the signal Szc to transition from low to high after the delay time d1 has elapsed since the output current Iout became smaller than the threshold Ith1. Thus, both the switching elements Q1 and Q2 are turned off.

FIG. 3 shows a case where the output current Iout has a peak larger than the threshold Ith1 and smaller than the threshold Ith2. In this case, after the ON interval has elapsed, the operation proceeds to the rectification interval. Thereafter, when the signal S0*d* transitions from high to low, both the switching elements Q1 and Q2 are turned off. When the output current Iout has not decreased to zero in the rectification interval, the energy in the inductor L1 is released by flowing through the body diode of the switching element Q2 in the OFF interval. However, since the switching operation of FIG. 3 includes the rectification interval, a length of a time for a current to flow through the body diode of the switching element Q2 is reduced than that of FIG. 20, thus improving efficiency.

FIG. 4 shows a case where the output current Iout has a peak smaller than the threshold Ith1. Also in this case, after the ON interval has elapsed, the operation proceeds to the rectification interval, in a manner similar to that of FIG. 3. Thereafter, when the signal S0*d* transitions from high to low, both the switching elements Q1 and Q2 are turned off. Since the operation of FIG. 4 includes the rectification interval, the length of the time for a current to flow through the body diode of the switching element Q2 is reduced than that of FIG. 21, thus improving efficiency.

According to FIGS. 2 to 4, it is possible to prevent or at least reduce a reverse current by turning off both the switching elements Q1 and Q2 according to the signal Szc or the signal S0*d*. In particular, since the length of the delay time d10 is set shorter than the delay time d1 of the zero crossing detector 12, it is possible to prevent or at least reduce a reverse current by turning off the switching element Q2 before a reverse current occurs, when the output current Iout is small, as shown in FIG. 4. In addition, according to FIGS. 3 and 4, since the switching operation includes the rectification interval even when the output current Iout is smaller than the threshold Ith2, it is possible to reduce the length of the time for a current to flow through the body diode of the switching element Q2, thus improving efficiency. As described above, the DC/DC converter 1 of FIG. 1 can operate more efficiently than the prior art, while preventing or at least reducing a reverse current.

[Configuration of Delay Circuit]

Figure 5:
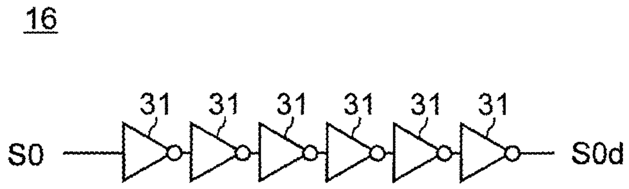
FIG. 5 is a circuit diagram showing a configuration of a delay circuit 16 of FIG. 1.

FIG. 5 is a circuit diagram showing a configuration of the delay circuit 16 of FIG. 1. The delay circuit 16 may include an even number of inverters 31 connected in series. The delay time d10 of the delay circuit 16 is a sum of the delay times of the inverters 31.

Figure 6:
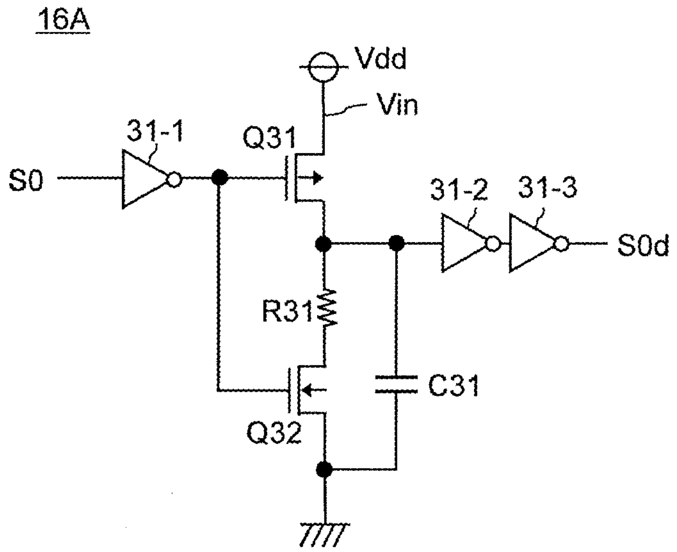
FIG. 6 is a circuit diagram showing a configuration of a delay circuit 16A according to a first modified embodiment.

FIG. 6 is a circuit diagram showing a configuration of a delay circuit 16A according to a first modified embodiment. The delay circuit 16A is provided with: inverters 31-1 to 31-3, switching elements Q31 and Q32, a resistor E31, and a capacitor C31. The delay time d10 of the delay circuit 16A is determined according to a time constant of the resistor R31 and the capacitor C31.

Figure 7:
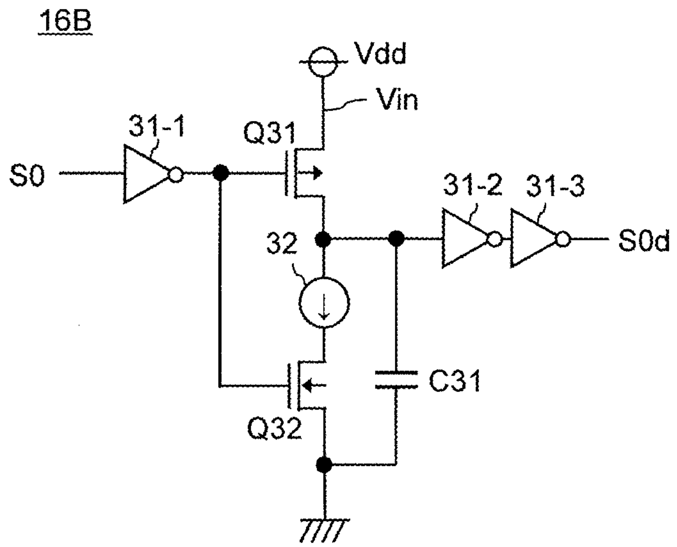
FIG. 7 is a circuit diagram showing a configuration of a delay circuit 16B according to a second modified embodiment.

FIG. 7 is a circuit diagram showing a configuration of a delay circuit 16B according to a second modified embodiment. The delay circuit 16B is provided with a constant current source 32 instead of the resistor R31 of FIG. 6. The delay time d10 of the delay circuit 16B is determined according to a current supplied from the constant current source 32, and a capacitance of the capacitor C31.

Figure 8:
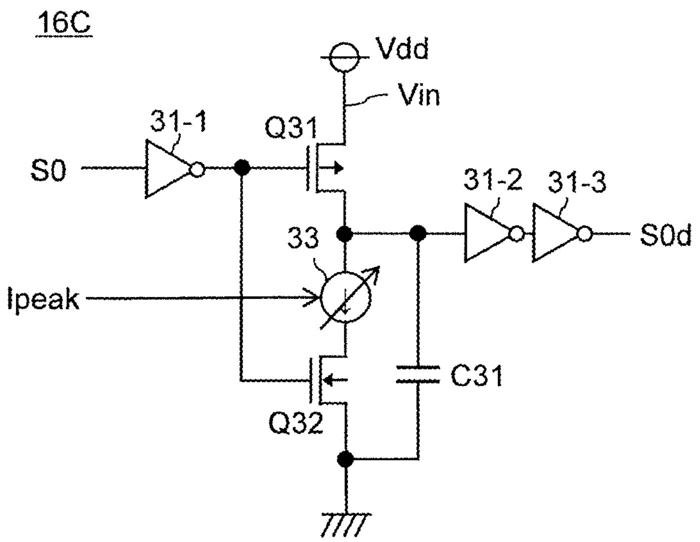
FIG. 8 is a circuit diagram showing a configuration of a delay circuit 16C according to a third modified embodiment.

FIG. 8 is a circuit diagram showing a configuration of a delay circuit 16C according to a third modified embodiment. The delay circuit 16C is provided with a variable current source 33 instead of the resistor R31 of FIG. 6. The variable current source 33 may be provided with a resistor to which a voltage across the switching element Q1 is applied. In this case, as the current flowing through the switching element Q1 increases, the voltage across the switching element Q1 also increases, and accordingly, the current flowing through the resistor also increases. By copying the current in the resistor using a current mirror, it is possible to obtain a variable current source varying according to the value of an output current Iout. The delay time d10 of the delay circuit 16C varies according to the magnitude of a peak Ipeak of the output current Iout. By changing the delay time d10, it is possible to further reduce the length of the time for the current to flow through the body diode of the switching element Q2.

Figure 9:
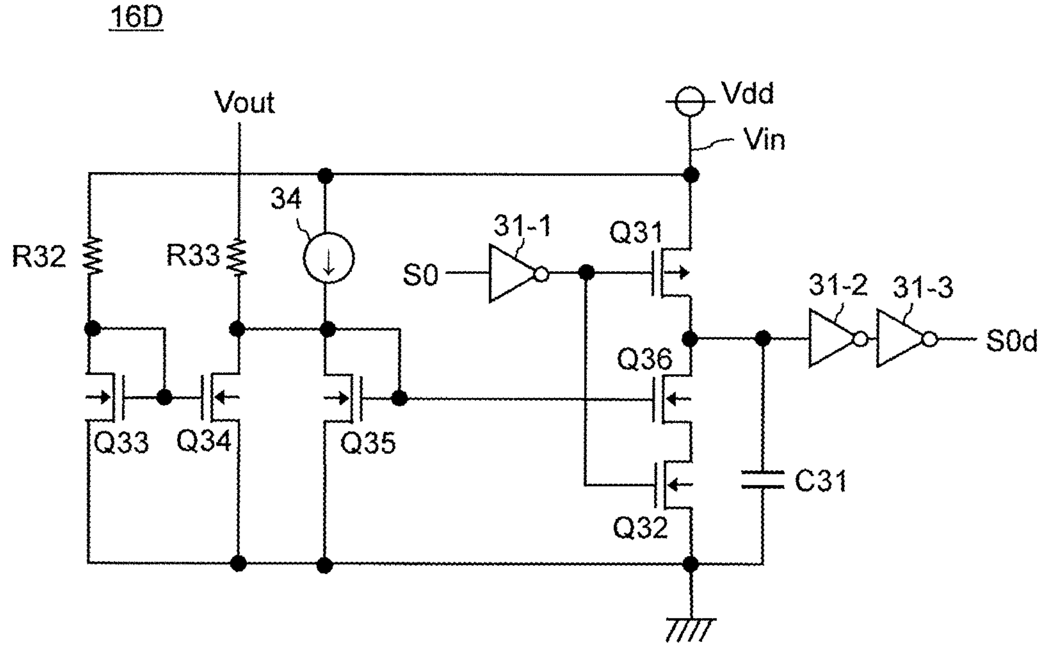
FIG. 9 is a circuit diagram showing a configuration of a delay circuit 16D according to a fourth modified embodiment.

FIG. 9 is a circuit diagram showing a configuration of a delay circuit 16D according to a fourth modified embodiment. The delay circuit 16D is provided with switching elements Q33 to Q36, resistors R32 and R33, and a constant current source 34, instead of the resistor R31 of FIG. 6. The circuit of FIG. 9 is a combination of a current mirror circuit operable as a variable current source varying according to the input voltage Vin, and another current mirror circuit operable as another variable current source varying according to the output voltage Vout. The delay time d10 of the delay circuit 16D varies according to a difference between the input voltage Vin and the output voltage Vout of the DC/DC converter 1. The lower the input voltage Vin, and/or the higher the output voltage Vout, the shorter the delay time d10 is. By changing the delay time d10, it is possible to further reduce the length of the time for the current to flow through the body diode of the switching element Q2.

The present invention is not limited to the examples of FIGS. 5 to 9, and any other delay circuit can be used.

[Summary of First Embodiment]

As described above, the DC/DC converter 1 according to the first embodiment can operate more efficiently than the prior art, while preventing or at least reducing a reverse current.

Second Embodiment

A DC/DC converter according to a second embodiment will be described with reference to FIGS. 10 to 13.

[Configuration of Second Embodiment]

Figure 10:
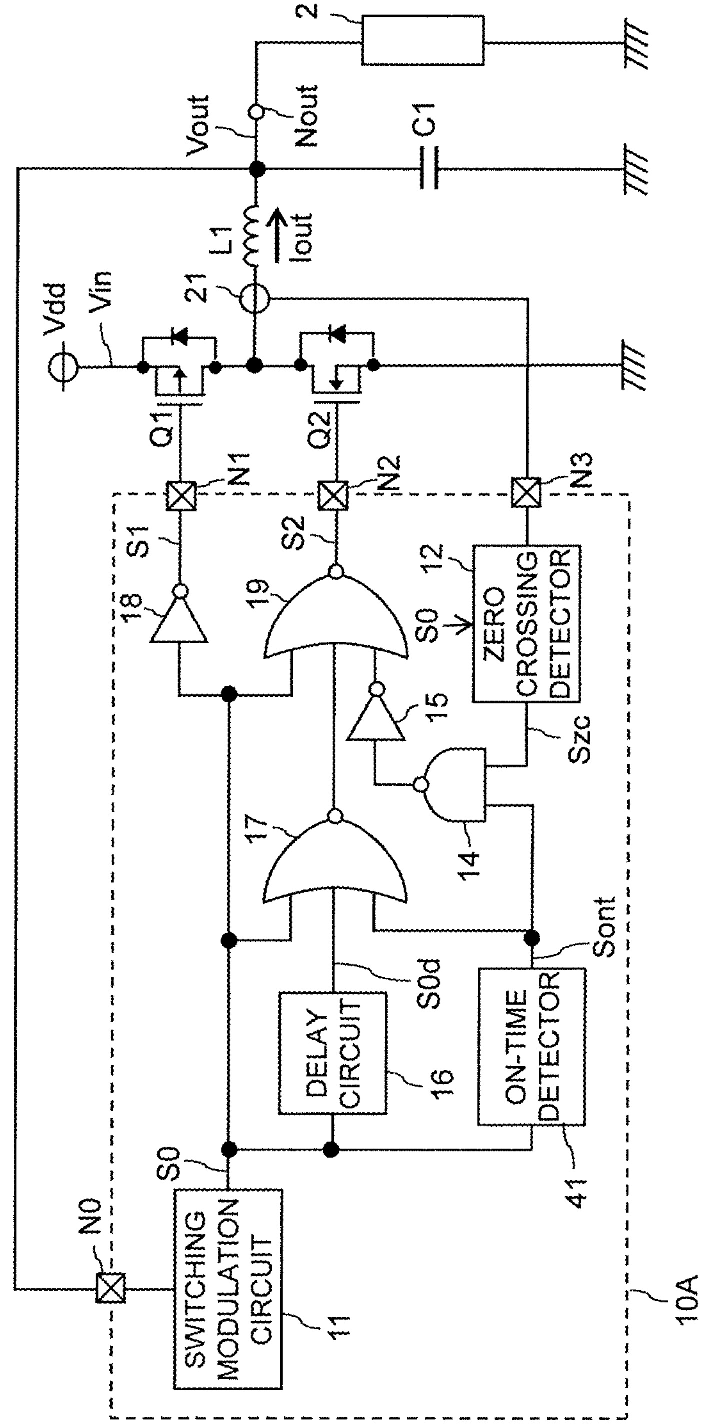
FIG. 10 is a block diagram showing a configuration of a DC/DC converter 1A according to a second embodiment.

FIG. 10 is a block diagram showing a configuration of a DC/DC converter 1A according to a second embodiment. The DC/DC converter 1A is provided with a control circuit 10A instead of the control circuit 10 of FIG. 1.

The control circuit 10A is provided with an on-time detector 41 instead of the peak current detector 13 of FIG. 1. The on-time detector 41 detects a reverse-flow possibility indicating a possibility in which the output current Iout reversely flows, and generates a signal Sont indicating whether or not the reverse-flow possibility exists. The on-time detector 41 detects, as the reverse-flow possibility, that a length of a time for storing the energy to the inductor L1 does not exceed a threshold Tth. When the length of the time for storing the energy to the inductor L1 is equal to or smaller than the threshold value Tth, the signal Sont is low, and when the length of the time for the storing the energy to the inductor L1 is longer than the threshold Tth, the signal Sont is high. When the time for storing the energy to the inductor L1 is short, the output current Iout would have a small peak, and as a result, it is considered that a reverse current may occur as described with reference to FIG. 17. The signal Sont is inputted to the NAND circuit 14 and the NOR circuit 17, instead of the signal Spc of FIG. 1.

The on-time detector 41 is an example of a monitoring circuit that detects the reverse-flow possibility of the output current Iout, and generates a control signal indicating whether or not the reverse-flow possibility exists.

[Operation of Second Embodiment]

Figure 11:
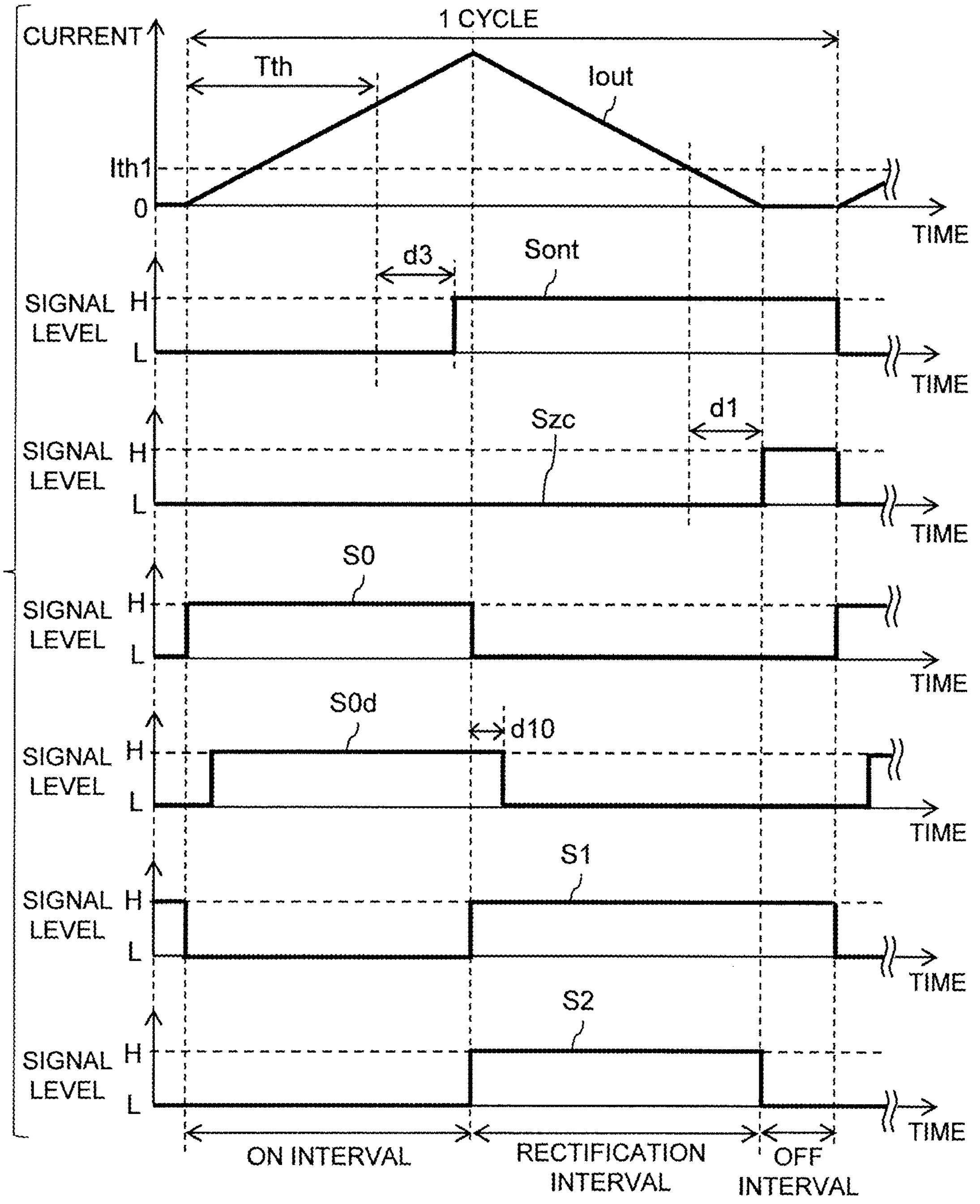
FIG. 11 is a timing chart showing a first exemplary operation of the DC/DC converter 1A of FIG. 10.
Figure 12:
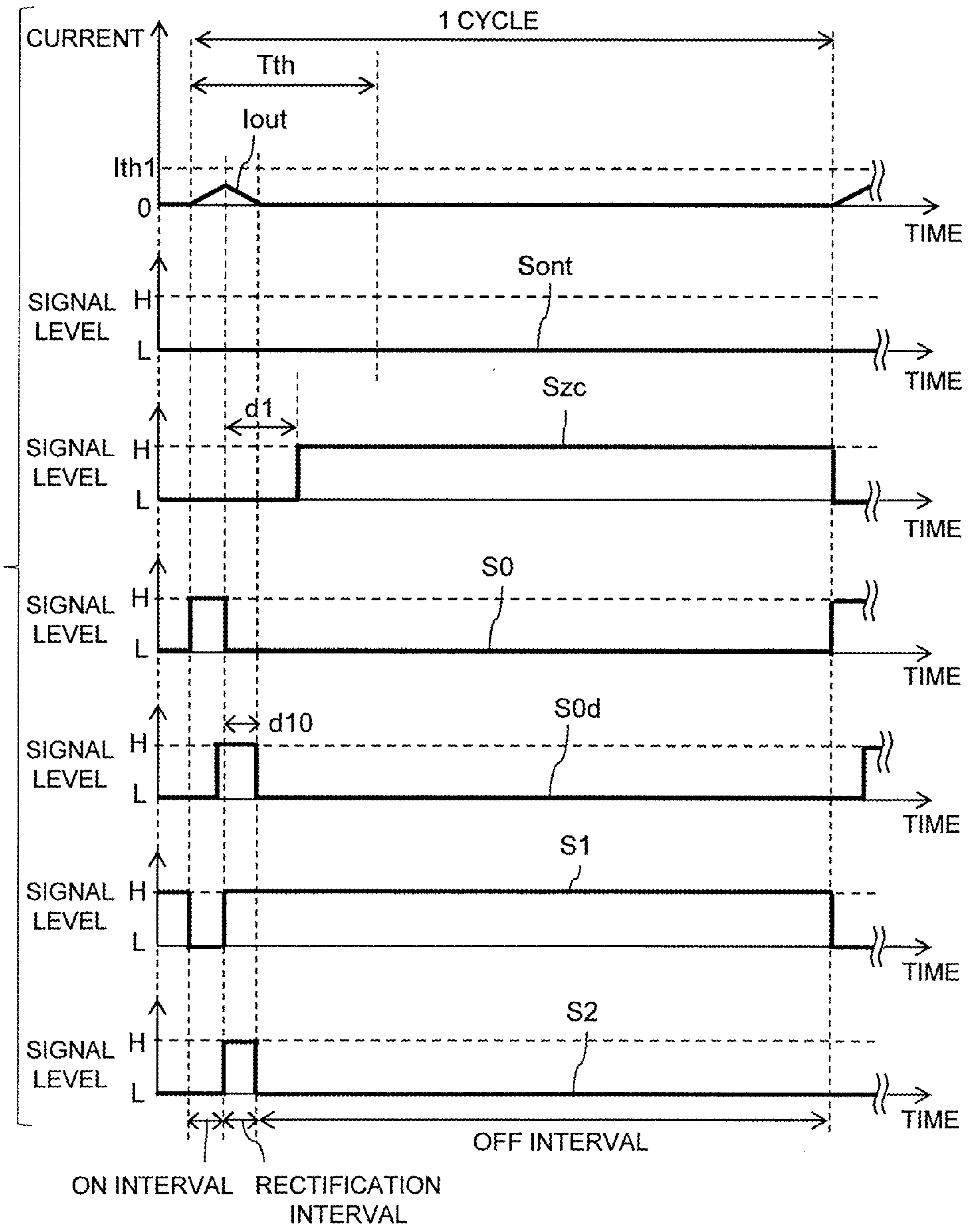
FIG. 12 is a timing chart showing a second exemplary operation of the DC/DC converter 1A of FIG. 10.

FIG. 11 is a timing chart showing a first exemplary operation of the DC/DC converter 1A of FIG. 10. FIG. 12 is a timing chart showing a second exemplary operation of the DC/DC converter 1A of FIG. 10. FIGS. 11 and 12 show the signal Sont instead of the signal Spc shown in FIGS. 2 to 4. The on-time detector 41 has an inherent delay time d3, which is from detecting that the length of the time for storing the energy to the inductor L1 is longer than the threshold Tth, to transitioning the signal Sont.

FIG. 11 shows a case where the ON interval is sufficiently long to estimate that no reverse current would occur, that is, it is longer than the threshold Tth. In this case, in the ON interval, the on-time detector 41 causes the signal Sont to transition from low to high after the delay time d3 has elapsed since the length of the time for storing the energy to the inductor L1 exceeded the threshold Tth. Thereafter, in the rectification interval, the zero crossing detector 12 causes the signal Szc to transition from low to high after the delay time d1 has elapsed since the output current Iout became smaller than the threshold Ith1. Thus, both the switching elements Q1 and Q2 are turned off.

FIG. 12 shows a case where the ON time is shorter than the threshold Tth. In this case, the signal Sont remains low. After the ON interval has elapsed, the operation proceeds to the rectification interval. Thereafter, when the signal S0*d* transitions from high to low, both the switching elements Q1 and Q2 are turned off.

According to FIGS. 11 and 12, it is possible to prevent or at least reduce a reverse current by turning off both the switching elements Q1 and Q2 according to the signal Szc or the signal S0*d*. In particular, since the length of the delay time d10 is set shorter than the delay time d1 of the zero crossing detector 12, it is possible to prevent or at least reduce a reverse current when the ON interval is short, as shown in FIG. 12. In addition, since the switching operation includes the rectification interval, it is possible to reduce the length of the time for a current to flow through the body diode of the switching element Q2, thus improving efficiency. As described above, the DC/DC converter 1A of FIG. 10 can operate more efficiently than the prior art, while preventing or at least reducing a reverse current.

[Configuration of Delay Circuit]

The delay circuit 16 of FIG. 10 may have any configuration of the delay circuit 16 of FIG. 5 and the delay circuits 16A to 16D of FIGS. 6 to 9.

Figure 13:
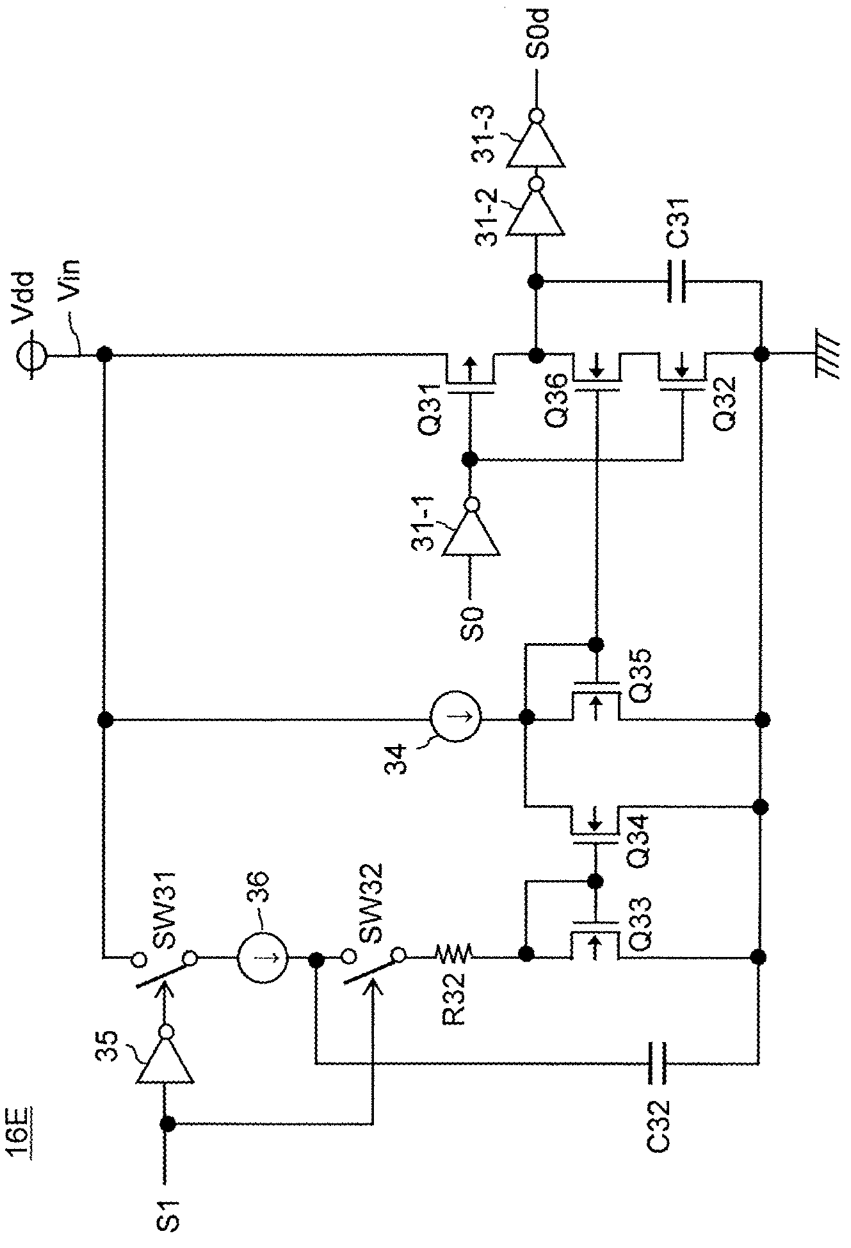
FIG. 13 is a circuit diagram showing a configuration of a delay circuit 16E according to a fifth modified embodiment.

FIG. 13 is a circuit diagram showing a configuration of a delay circuit 16E according to a fifth modified embodiment. The control circuit 10A of FIG. 10 may be provided with the delay circuit 16E of FIG. 13 instead of the delay circuit 16 of FIG. 5. The delay circuit 16E is provided with an inverter 35, a constant current source 36, switches SW31 and SW32, and a capacitor C32, instead of the resistor R33 of FIG. 9. The delay time d10 of the delay circuit 16E varies according to the length of the time for storing the energy to the n inductor L1 (that is, the length of the time for which the signal S1 is high). By changing the delay time d10, it is possible to further reduce the length of the time for the current to flow through the body diode of the switching element Q2.

The present invention is not limited to the examples of FIGS. 5 to 9 and 13, and any other delay circuit can be used.

[Summary of Second Embodiment]

As described above, the DC/DC converter 1A according to the second embodiment can operate more efficiently than the prior art, while preventing or at least reducing a reverse current.

Third Embodiment

A DC/DC converter according to a third embodiment will be described with reference to FIG. 14.

Figure 14:
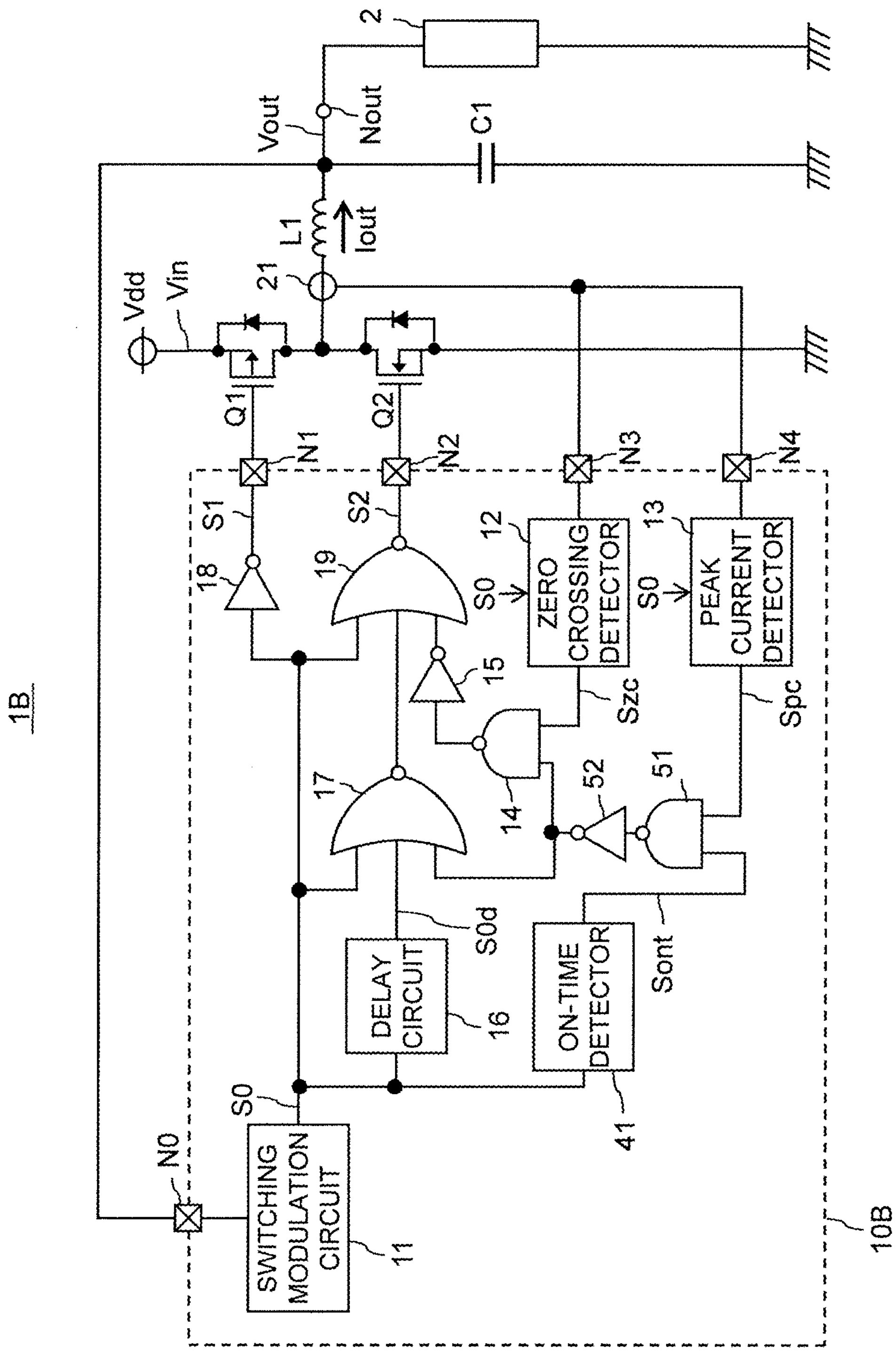
FIG. 14 is a block diagram showing a configuration of a DC/DC converter 1B according to a third embodiment.

FIG. 14 is a block diagram showing a configuration of a DC/DC converter 1B according to a third embodiment. The DC/DC converter 1B is provided with a control circuit 10B instead of the control circuit 10 of FIG. 1.

The control circuit 10B is provided with the on-time detector 41, a negative AND (NAND) circuit 51, and an inverter 52, in addition to the components of the control circuit 10 of FIG. 1. In other words, the control circuit 10B has a configuration as a combination of the control circuit 10 of FIG. 1 and the control circuit 10A of FIG. 10.

Since the DC/DC converter 1B according to the third embodiment has the configuration as a combination of the first and second embodiments, the DC/DC converter 1B can more reliably prevent or at least reduce a reverse current than the first and second embodiments, and operate much more efficiently.

OTHER MODIFIED EMBODIMENTS

The examples of FIG. 2 and others illustrate the cases where the signal S0*d* is generated with both rising and falling of the signal S0 being delayed. However, according to the described embodiments, only a portion of the signal S0 corresponding to the end of the ON interval (falling in the examples of FIG. 2 and others) may be delayed for the delay time d10. Another portion of the signal S0 corresponding to the start of the ON interval (rising in the examples of FIG. 2 and others) may not be delayed, or may be delayed for a delay time different from the delay time d10.

According to the examples of FIG. 1 and others, the switching elements Q1 and Q2 are provided external to the integrated circuit having the terminals NO to N4. However, the switching elements Q1 and Q2 may be integrated within the control circuit 10.

FIGS. 1, 10, and 14 show exemplary DC/DC converters as step-down converters. On the other hand, the controls of the DC/DC converters according to the embodiments are also applicable to step-up converters or step-up/down converters.

[Summary of Embodiments]

According a control circuit 10, 10A, 10B for a DC/DC converter 1, 1A, 1B of a first aspect of the present disclosure, the control circuit 10, 10A, 10B is provided for controlling the DC/DC converter 1, 1A, 1B having an inductor L1 and first and second switching elements Q1, Q2. The first and second switching elements Q1, Q2 storing energy to the inductor L1 and releasing the energy from the inductor L1. The control circuit 10, 10A, 10B is provided with: a switching modulation circuit 11, a delay circuit 16, a zero crossing detector 12, a monitoring circuit, and a driver circuit. The switching modulation circuit 11 is configured to generate a first control signal having a duty ratio including an ON state and an OFF state; The delay circuit 16 is configured to delay the first control signal for a first delay time to generate a second control signal. The zero crossing detector 12 is configured to detect whether or not an output current of the DC/DC converter 1, 1A, 1B is smaller than a first threshold when releasing the energy from the inductor L1, and to generate a third control signal indicating whether or not the output current is smaller than the first threshold. The monitoring circuit is configured to detect whether or not a reverse-flow possibility exists, the reverse-flow possibility indicating a possibility in which the output current reversely flows, and to generate a fourth control signal indicating whether or not the reverse-flow possibility exists. The driver circuit configured to generate drive signals for turning on and off the first and second switching elements Q1, Q2, based on the first to fourth control signals. The zero crossing detector 12 has a second delay time from detecting that the output current is smaller than the first threshold, to transitioning the third control signal, the second delay time being inherent to the zero crossing detector 12. The first delay time is set shorter than the second delay time. When the fourth control signal indicates that the reverse-flow possibility does not exist, the inductor L1 is releasing the energy, and the third control signal has transitioned to indicate that the output current is smaller than the first threshold, the driver circuit turns off both the first and second switching elements Q1, Q2. When the fourth control signal indicates that the reverse-flow possibility exists, the inductor L1 is releasing the energy, and the second control signal has transitioned from an ON state to an OFF state, the driver circuit turns off both the first and second switching elements Q1, Q2.

According to a control circuit 10 for a DC/DC converter 1 of a second aspect of the present disclosure, the control circuit of the first aspect may be configured as follows. The monitoring circuit is further configured to detect, as the reverse-flow possibility, that the output current does not exceed a second threshold when storing the energy to the inductor L1.

According to a control circuit 10 for a DC/DC converter 1 of a third aspect of the present disclosure, the control circuit of the second aspect may be configured as follows. The delay circuit 16C is further configured to change a length of the first delay time according to a magnitude of a peak of the output current.

According to a control circuit 10A for a DC/DC converter 1 of a fourth aspect of the present disclosure, the control circuit of the second aspect may be configured as follows. The delay circuit 16D is further configured to change a length of the first delay time according to a difference between an input voltage and an output voltage of the DC/DC converter 1.

According to a control circuit 10A for a DC/DC converter 1 of a fifth aspect of the present disclosure, the control circuit of the first aspect may be configured as follows. The monitoring circuit is further configured to detect, as the reverse-flow possibility, that a length of a time for storing the energy to the inductor L1 does not exceed a third threshold.

According to a control circuit 10A for a DC/DC converter 1 of a sixth aspect of the present disclosure, the control circuit of the fifth aspect may be configured as follows. The delay circuit 16C is further configured to change a length of the first delay time according to a magnitude of a peak of the output current.

According to a control circuit 10A for a DC/DC converter 1 of a seventh aspect of the present disclosure, the control circuit of the fifth aspect may be configured as follows. The delay circuit 16D is further configured to change a length of the first delay time according to a difference between an input voltage and an output voltage of the DC/DC converter 1.

According to a control circuit 10A for a DC/DC converter 1 of a eighth aspect of the present disclosure, the control circuit of the fifth aspect may be configured as follows. The delay circuit 16E is further configured to change a length of the first delay time according to the length of the time for storing the energy to the inductor L1.

According to a DC/DC converter 1, 1A, 1B of a ninth aspect of the present disclosure, the DC/DC converter 1 is provided with: an inductor L1; first and second switching elements Q1, Q2 that store energy to the inductor L1 and release the energy from the inductor L1; and the control circuit 10, 10A, 10B of the DC/DC converter 1, 1A, 1B of one of first to eighth aspects.

REFERENCE SIGNS LIST

1, 1A to 1D: DC/DC converter
2: load device
10, 10A to 10D: control circuit
11: switching modulation circuit
12: zero crossing detector
13: peak current detector
14: negative AND (NAND) circuit
15: inverter
16: delay circuit
17: negative OR (NOR) circuit
18: inverter
19: negative OR (NOR) circuit
21: current sensor
31, 31-1 to 31-3: inverter
32: constant current source
33: variable current source
34: constant current source
35: inverter
36: constant current source
41: on-time detector
51: negative AND (NAND) circuit
52: inverter
61: inverter
62: negative OR (NOR) circuit
71: inverter
72: inverter
73: negative OR (NOR) circuit
C1, C31, C32: capacitor
L1: Inductor
Q1, Q2, Q31 to Q36: switching element
R31 to R33: resistor
SW31, SW32: switch

The invention claimed is:

1. A control circuit for controlling a DC/DC converter comprising an inductor and first and second switching elements, the first and second switching elements storing energy to the inductor and releasing the energy from the inductor, the control circuit comprising:

a switching modulation circuit configured to generate a first control signal having a duty ratio including an ON state and an OFF state;

a delay circuit configured to delay the first control signal for a first delay time to generate a second control signal;

a zero crossing detector configured to detect whether or not an output current of the DC/DC converter is smaller than a first threshold when releasing the energy from the inductor, and to generate a third control signal indicating whether or not the output current is smaller than the first threshold;

a monitoring circuit configured to detect whether or not a reverse-flow possibility exists, the reverse-flow possibility indicating a possibility in which the output current reversely flows, and to generate a fourth control signal indicating whether or not the reverse-flow possibility exists; and a driver circuit configured to generate drive signals for turning on and off the first and second switching elements, based on the first to fourth control signals, wherein the zero crossing detector has a second delay time from detecting that the output current is smaller than the first threshold, to transitioning the third control signal, the second delay time being inherent to the zero crossing detector, wherein the first delay time is set shorter than the second delay time, wherein, when the fourth control signal indicates that the reverse-flow possibility does not exist, the inductor is releasing the energy, and the third control signal has transitioned to indicate that the output current is smaller than the first threshold, the driver circuit turns off both the first and second switching elements, and wherein, when the fourth control signal indicates that the reverse-flow possibility exists, the inductor is releasing the energy, and the second control signal has transitioned from an ON state to an OFF state, the driver circuit turns off both the first and second switching elements.

2. The control circuit for the DC/DC converter as claimed in claim 1, wherein the monitoring circuit is further configured to detect, as the reverse-flow possibility, that the output current does not exceed a second threshold when storing the energy to the inductor.

3. The control circuit for the DC/DC converter as claimed in claim 2, wherein the delay circuit is further configured to change a length of the first delay time according to a magnitude of a peak of the output current.

4. The control circuit for the DC/DC converter as claimed in claim 2, wherein the delay circuit is further configured to change a length of the first delay time according to a difference between an input voltage and an output voltage of the DC/DC converter.

5. The control circuit for the DC/DC converter as claimed in claim 1, wherein the monitoring circuit is further configured to detect, as the reverse-flow possibility, that a length of a time for storing the energy to the inductor does not exceed a third threshold.

6. The control circuit for the DC/DC converter as claimed in claim 5, wherein the delay circuit is further configured to change a length of the first delay time according to a magnitude of a peak of the output current.

7. The control circuit for the DC/DC converter as claimed in claim 5, wherein the delay circuit is further configured to change a length of the first delay time according to a difference between an input voltage and an output voltage of the DC/DC converter.

8. The control circuit for the DC/DC converter as claimed in claim 5, wherein the delay circuit is further configured to change a length of the first delay time according to the length of the time for storing the energy to the inductor.

9. A DC/DC converter comprising:

an inductor;

first and second switching elements that store energy to the inductor and release the energy from the inductor; and a control circuit comprising:

a switching modulation circuit configured to generate a first control signal having a duty ratio including an ON state and an OFF state;

a delay circuit configured to delay the first control signal for a first delay time to generate a second control signal;

a zero crossing detector configured to detect whether or not an output current of the DC/DC converter is smaller than a first threshold when releasing the energy from the inductor, and generate a third control signal indicating whether or not the output current is smaller than the first threshold;

a monitoring circuit configured to detect whether or not a reverse-flow possibility exists, the reverse-flow possibility indicating a possibility in which the output current reversely flows, and generate a fourth control signal indicating whether or not the reverse-flow possibility exists; and a driver circuit configured to generate drive signals for turning on and off the first and second switching elements, based on the first to fourth control signals, wherein the zero crossing detector has a second delay time from detecting that the output current is smaller than the first threshold, to transitioning the third control signal, the second delay time being inherent to the zero crossing detector, wherein the first delay time is set shorter than the second delay time, wherein, when the fourth control signal indicates that the reverse-flow possibility does not exist, the inductor is releasing the energy, and the third control signal has transitioned to indicate that the output current is smaller than the first threshold, the driver circuit turns off both the first and second switching elements, and wherein, when the fourth control signal indicates that the reverse-flow possibility exists, the inductor is releasing the energy, and the second control signal has transitioned from an ON state to an OFF state, the driver circuit turns off both the first and second switching elements.

* * * * *